United States Patent [19]

Zabielski et al.

[11] Patent Number: 4,724,028
[45] Date of Patent: Feb. 9, 1988

[54] METHOD OF MANUFACTURING DISC-SHAPED RUBBER ARTICLES, SUCH AS INJECTION SITES

[75] Inventors: Kenneth Zabielski, McHenry; Harold H. Bowerman, Jr., Libertyville, both of Ill.

[73] Assignee: Baxter Travenol Laboratories, Deerfield, Ill.

[21] Appl. No.: 485,142

[22] Filed: Apr. 15, 1983

[51] Int. Cl.⁴ .................... B32B 31/12; B32B 31/26
[52] U.S. Cl. .................... 156/256; 156/293; 156/307.3; 156/308.2; 156/308.6
[58] Field of Search ............ 156/293, 731, 256, 303.1, 156/308.4, 308.2, 308.6, 307.3, 306.6; 427/393.5, 400, 289; 264/149, 152, 158, 159, 157, 340; 260/694; 215/247, 249; 604/415; 428/357, 375

[56] References Cited

U.S. PATENT DOCUMENTS

| | | | |
|---|---|---|---|
| 1,858,279 | 5/1932 | Parker | 156/244.13 |
| 2,126,733 | 8/1938 | Catt | 264/159 |
| 2,170,919 | 8/1939 | Thener | 264/159 X |
| 2,333,922 | 11/1943 | Foster | 174/125 |
| 2,688,768 | 9/1954 | Rayburn | 18/6 |
| 2,702,733 | 2/1955 | Penn et al. | 128/70 |
| 3,551,273 | 12/1970 | McKinney | 215/247 |
| 3,628,681 | 12/1971 | Schwartz | 215/48 |
| 3,647,386 | 3/1972 | Gilford | 229/56 |
| 3,760,969 | 9/1973 | Shimamoto et al. | 215/DIG. 3 |
| 3,934,746 | 1/1976 | Lilja | 215/247 |
| 3,968,316 | 7/1976 | Jyo et al. | 427/400 X |
| 4,066,183 | 1/1978 | Armstrong | 215/247 |
| 4,254,884 | 3/1910 | Maruyama | 215/247 |
| 4,279,352 | 7/1981 | Ward | 215/247 |
| 4,442,174 | 4/1984 | Neumann et al. | 428/376 |

FOREIGN PATENT DOCUMENTS 0702928 1/1954 United Kingdom .
2007997 5/1979 United Kingdom .

OTHER PUBLICATIONS

Webster's New Collegiate Dictionary, G & C Merriam Co., Springfield, Mass., 1977, pp. 110, 125.

Primary Examiner—Jerome Massie
Assistant Examiner—Ramon R. Hoch
Attorney, Agent, or Firm—Paul C. Flattery; Garrettson Ellis; Daniel D. Ryan

[57] ABSTRACT

An injection site may be made of a disc of puncture-resealable rubber in which the periphery carries a coating of thermoplastic material which is bonded to a sealingly compatible surface to retain the injection site in position. The injection site may be made by coating a rod of puncture-resealable rubber with a plastic material, followed by transversely slicing the coated rod into discs, which may then be sealed to the sealingly compatible surfaces.

20 Claims, 6 Drawing Figures

METHOD OF MANUFACTURING DISC-SHAPED RUBBER ARTICLES, SUCH AS INJECTION SITES

TECHNICAL FIELD

Injection sites made of natural rubber latex and similar puncture-resealable rubber discs and membranes are well known and in common use to cover ampules of vaccines and other medications, as well as for providing access to parenteral solution containers and sets for the delivery of solution to a patient. Injection sites are also used in other technologies such as gas chromatography. For example, Ward U.S. Pat. No. 4,279,352 shows a type of molded injection site that can be placed upon the end of tubing communicating with a container for parenteral solution or the like. A latex cap is used on the VIAFLEX® solution containers sold by Travenol Laboratories, Inc. as an injection site.

In Penn et al. U.S. Pat. No. 2,702,773 and Maruyama U.S. Pat. No. 4,254,884, flat pieces of rubber, such as a rubber disc, may be bonded to a segment of other material through adhesion provided by coatings on all or part of the major faces of the flat component. The coatings may be made of thermoplastic material.

McKinney U.S. Pat. No. 3,551,273 discloses a septum for use in a gas chromatograph comprising a layered rubber disc.

In accordance with this invention, a method of manufacturing an improved design of injection site utilizing a puncture-resealable rubber disc is provided, which can be manufactured with greater ease and reduced cost to provide high-reliability, inexpensive injection sites that do not fall off, as do some known injection sites of the medical field. The method is particularly susceptible to automation, with a reduced reject rate over other designs for highly desirable mass production purposes.

DESCRIPTION OF INVENTION

By this invention an injection site can be provided which comprises a disc of puncture-resealable rubber having opposed major faces and defining a periphery between the faces. The periphery carries a coating of plastic material, typically thermoplastic, with the major faces being essentially free of said coating. A surface, for example the inside of a tube or a flat surface, may be made of a material sealingly compatible with the coating carried on the periphery, and the coating is sealed by heat or by solvent to that surface.

It is to be understood that the term "disc" does not necessarily call for a structure of round periphery. Other flat, wafer-like structures may be used as equivalents thereto, for example oval or square, flat, disc-like structures may be used as a substitute for the typically preferred disc of round periphery.

Puncture-resealable rubber materials are well known to those skilled in the art, so it is unnecessary to recite a list of them. Typically, natural rubber latex or equivalent polyisoprene rubbers of artificial manufacture are used, but any other appropriate hydrocarbon rubber or other material which exhibits sufficient resealability to withstand a needle puncture under the circumstances of use may be used to make the puncture-resealable rubber discs of this invention.

Similarly, the coating of plastic material carried on the periphery of the disc may be any desired thermoplastic material which is sealingly compatible with the surface to which it is to adhere. It is typically contemplated that the adhesion step of the coating to the surface will be performed by a heat sealing process, preferably a radio frequency sealing process or an ultrasonic sealing process, which are well known and in wide commercial use. If desired, solvent sealing with cyclohexanone or the like or other adhesive techniques may be used for the adhesion purposes as well.

Also, the plastic material may be an uncurled adhesive which is then cured to bond the disc to the sealingly compatible surface.

Polyvinyl chloride plastic formulations are often preferred as both the coating of thermoplastic material and the surface to which it adheres, since it shows good advantage in RF sealing processes. However, if one desires to seal the injection site of this invention to a polyolefin container, for example polyethylene or polypropylene, the coating of thermoplastic material on the periphery of the disc may be made of a corresponding sealingly-compatible material, with ultrasonic welding being used.

One candidate for the coating of thermoplastic material on the periphery of the disc for bonding to polyolefin containers is poly(ethylene-propylene-nonconjugated diene), for example SANTOPRENE sold by Monsanto Chemical Company. An advantage of this material is that, while thermoplastic, it has a softening temperature high enough to withstand autoclaving without serious softening, rendering it a candidate for use in polyolefin containers for medical solutions and the like.

Similarly, many other thermoplastic materials can be used to adhere the injection site to a large variety of plastic and other surfaces.

Primers and adhesives may be used if desired to render the puncture-resealable rubber disc more firmly bonded to the peripheral coating of thermoplastic material. The nature of the primer or adhesive will depend upon the type of puncture-resealable rubber and the type of thermoplastic material used. Preferably, when the disc is made of a polyisoprene rubber such as natural latex of a similar hydrocarbon rubber, the rubber may be chlorinated or brominated at its surface to render it more adhesive to polyvinyl chloride thermoplastic, for example.

The injection sites of this invention may be manufactured by coating a solid rod of puncture-resealable rubber with a thermoplastic coating material. The coated rod is then transversely sliced into a plurality of discs which, as a consequence of this, carry the thermoplastic coating material only at their peripheries and not on the opposed major faces, which are created by the slicing action. Thereafter the thermoplastic coatings of the discs are sealed by heat or by solvent to sealingly compatible surfaces, to affix the discs into predetermined positions relative to said surfaces.

Specifically, the sealingly compatible surfaces may be surfaces defining the bores of sealingly compatible tubes. Alternatively, the coated disc may be placed on a flat surface of sealingly compatible material with one of the major faces typically in abutment therewith, and an annular edge of the coating is sealingly adhered thereto, preferably by a heat seal technique such as radio frequency sealing or ultrasonic sealing, so that the resulting seal between the compatible surface and the thermoplastic coating is an annular seal.

DESCRIPTION OF THE DRAWINGS

In the drawings.

FIG. 3 is an exploded elevational view showing a Y-tube injection site, usable as a component of a blood or solution administration set, or the like.

DESCRIPTION OF SPECIFIC EMBODIMENTS

Figure 1:
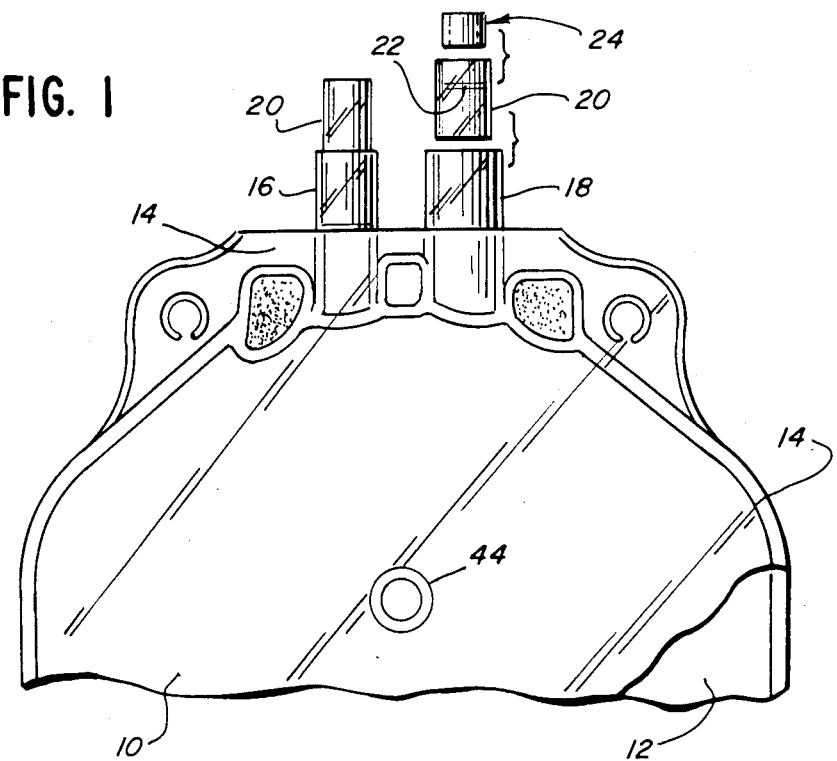
FIG. 1 is a fragmentary, partially exploded elevational view of a flexible, collapsible solution container carrying two different embodiments of the injection site of this invention.

Referring to FIG. 1, a solution container, for example a container of solution for parenteral administration or for peritoneal dialysis, comprises walls 10, 12 which may be made of a thermoplastic such as polyvinyl chloride plastic, sealed together at the periphery 14 with a radio frequency heat seal. Except as otherwise indicated, the container may be, for example, of the design of VIAFLEX ® solution containers sold by Travenol Laboratories, Inc.

As shown, the container may carry a pair of ports 16, 18 which are sealed in heat seal 14 for firm sealing retention therein to provide communication with the interior of the container. Within each of ports 16, 18 is a smaller molded membrane port 20, which can be seen to carry membrane 22 across its bore.

In accordance with this invention, injection site member 24 may be made of a disc 26 (FIG. 2) of puncture-resealable rubber, particularly polyisoprene latex, and coated on its periphery with an annular coating 28 of polyvinyl chloride plastic.

Figure 2:
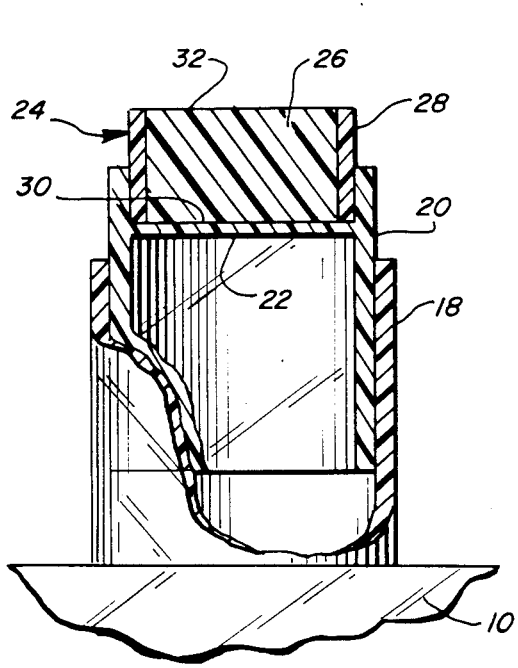
FIG. 2 is an enlarged, fragmentary elevational view, with portions broken away, showing one of the injection sites of FIG. 1.

As shown in FIG. 2, injection site member 24 may be placed within membrane tube 20 to abut against membrane 22 for positioning, or alternatively membrane tube 20 may be omitted for cost saving, and injection site member 24 adhered directly to the bore of port 18. Both ports 16 and 18 and membrane tubes 20 may be made of polyvinyl chloride plastic, so in manufacture the entire array of port 18, membrane tube 20 (when used), and injection site member 24 may be heat sealed together with a conventional radio frequency sealing machine to form a firm, tight hermetic seal between coating of polyvinyl chloride 28 and the inner bore of membrane tube 20, and the outer periphery of tube 20 and the inner bore of tube 18. The resulting arrangement provides a needle-resealable injection site which is free of some of the prior art problem of popping off at inconvenient moments, as has been the case with some commercial injection sites used with containers of the type shown. As stated above, the adhesion between peripheral coating 28 and rubber disc 26 can be promoted by means of a primer, for example, by chlorination of the periphery of rubber disc 26.

As shown in FIG. 2, rubber disc 26 defines opposed major faces 30, 32, one of which may abut membrane 22 and the other of which is exposed to the exterior.

Figure 3:
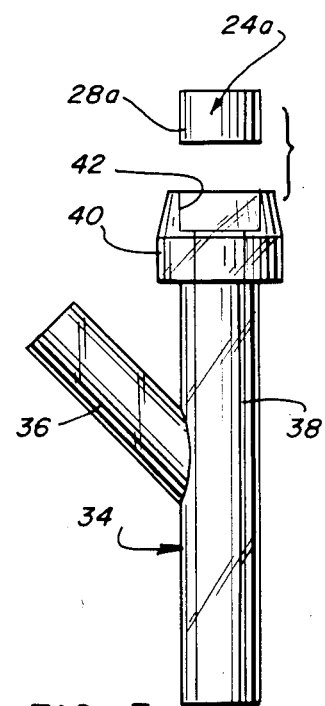

Referring to FIG. 3, branched tubing 34 may be made out of polyvinyl chloride plastic or any other desired thermoplastic material and comprises a pair of branched, interconnecting tubes 36, 38. Tube 38 defines an enlarged socket member 40 which, in turn, defines an aperture 42 proportioned to receive injection site member 24a, which may be of similar or identical design to injection site member 24, being a disc of puncture-resealable rubber having opposed major faces and defining a periphery between the faces, with the periphery only carrying the coating 28a of thermoplastic material, specifically polyvinyl chloride plastic, to be sealingly compatible with the plastic material defining socket 42.

After radio frequency sealing of injection site member 24a into socket 42 a firmly affixed injection site is thus provided, which may then be included as a component of a tubular set in generally conventional manner for parenteral solution sets, blood administration sets, sets for peritoneal dialysis or hemodialysis, or any other desired use.

A second injection site 44 is shown carried on the collapsible solution container of FIG. 1.

Typically, a container will carry only one and not both of injection sites 24 or 44, the two sites being shown on the container of FIG. 1 for economy of illustration.

Figure 5:
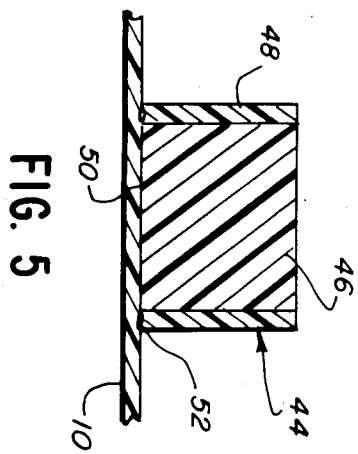
FIG. 5 is a longitudinal sectional view, substantially enlarged, of the other injection site of FIG. 1.

FIG. 5 shows injection site 44 in greater detail. As in the previous embodiments, injection site 44 may include a disc 46 of puncture-resealable rubber such as natural rubber latex, coated on its periphery with a coating of thermoplastic material 48 such as polyvinyl chloride. Injection site member 44 may in fact be of identical design to injection site member 24, although it may be desirable for coating 48 to be somewhat thicker than coating 28.

As shown, injection site 44 rests upon the surface of wall 10, which may be made of polyvinyl chloride plastic or another thermoplastic which is sealingly compatible with the coating 48 of thermoplastic material. In this instance, major face 50 of rubber disc 46 abuts wall 10, being retained in position by an annular heat seal 52 which provides a hermetic seal to the area within the annular seal. Thus a hypodermic needle can penetrate disc 46 and wall 10. While wall 10 may not be resealable, the rubber material of disc 46 is resealable so that, while a thin film of liquid may find its way into the junction between face 50 and wall 10, it cannot leak out of the system.

Figure 6:
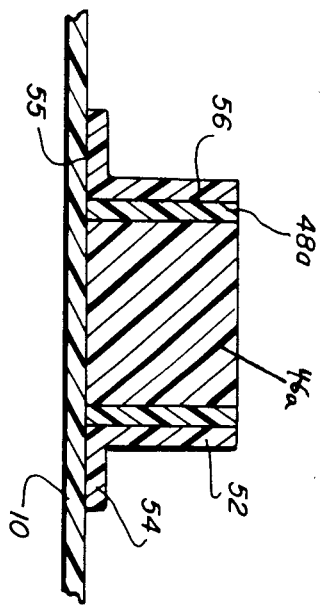
FIG. 6 is a longitudinal sectional view of an alternative embodiment for the other injection site of FIG. 1.

Referring to FIG. 6, an alternative embodiment is shown to provide stronger bonding of the rubber disc to thermoplastic wall 10 of the container. Rubber disc 46a may be identical to disc 46, while thermoplastic peripheral coating 48a may be identical to coating 48. However, in this instance, reliance on an edge seal of thermoplastic coating 48a to wall 10 is avoided by an added sleeve 52 made of compatible thermoplastic, for example polyvinyl chloride. Sleeve 52 may carry annular flange 54 which provides a larger, more easily sealed junction area 55 with wall 10. At the same time a large surface area 56 is also provided for sealing between sleeve 52 and thermoplastic coating 48a. This provides a potentially stronger system, for those instances where the construction of FIG. 5 exhibits insufficient strength.

A specific, desirable alternative formulation of thermoplastic material to polyvinyl chloride plastic in this invention is a mixture of Eastman PETG 5126 and DuPont HYTREL 4056 in a respective proportion of 40 percent to 60 percent by weight. The various sleeves (for example sleeves 18 and 20) and the coated rubber disc can be assembled, and if sleeves 18,20 and coating 28 are made out of the above material or materials similar to it, they can heat seal together to form the desired sealed injection site during the autoclaving process, which is conventionally used to sterilize containers of solution for use in the medical field.

Figure 4:
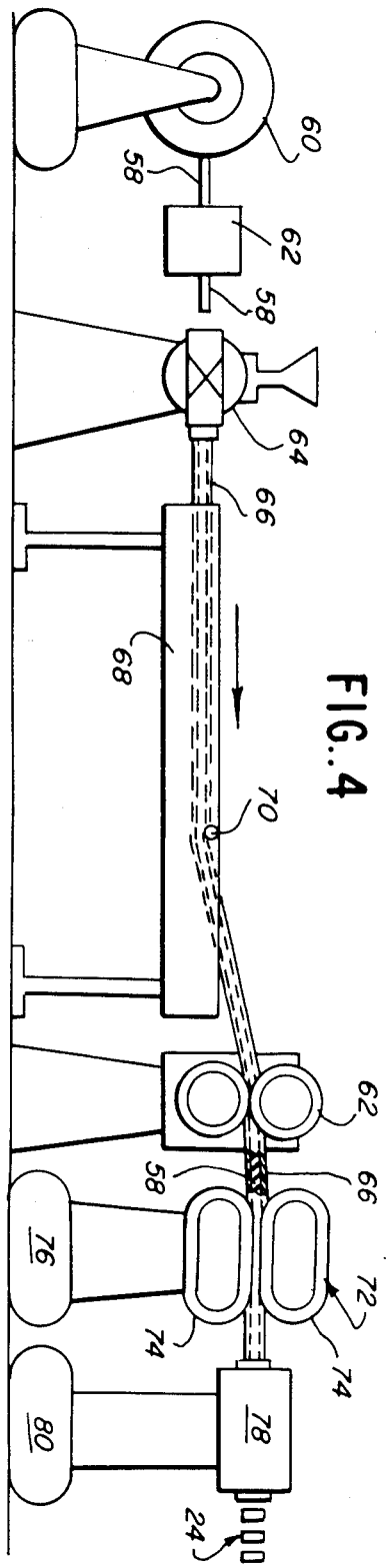
FIG. 4 is a generally schematic view of part of an automated manufacturing process for making injection sites in accordance with this invention.

Referring to FIG. 4, a portion of an automated process for manufacturing injection site members or similar structures is disclosed. A coil of rubber rod 58 is unwound from spool 60. Rubber rod 58 may be made of polyisoprene and may have a diameter, for example, of 0.295 inch. For example, 100 parts by weight of NATSYN 2200 or NATSYN 2205, sold by Goodyear Rubber Company, may be mixed with 1.5 parts of dicumyl perioxide as a curing agent and 5 parts by weight of AEROSIL 200 silica, sold by Degussa. This mixture may be extruded into the rubber rod and cured in molten salt (to activate the peroxide) at a temperature of 400° F. for one minute. The rubber rod can then be washed to remove any salt.

Following this, the rubber rod can be exposed to a solution of sodium hypochlorite and hydrochloric acid, to provide a chlorine concentration of 750 to 1000 parts per million, the time of exposure being 30 to 60 seconds. Thereafter the rubber can be dipped in one percent ammonium hydroxide solution to neutralize the acidic solution and rinsed in water. Thereafter it may be blown dry. The above chlorination process is schematically represented at station 62, where it may be part of a continuous process in accordance with this invention.

Alternatively, prechlorinated rubber rod can be purchased from various vendors.

Chlorine-treated rubber rod 58 is fed into extruder 64, which may be of a conventional design, to coat rod 58 with an outer coating 66 of polyvinyl chloride plastic which is 0.024 inch thick, the adhesion of which is promoted by the chlorinated surface of rod 58. Rod 58, with its coating 66, is then passed into cooling tank 68 containing water or other cooling medium to solidify coating 66, being guided by wheel idler 70 to take up rollers 62.

Following this, rubber rod 58, having polyvinyl chloride coating 66, is passed through feed guide station 72 in which caterpillar track type treads 74, driven by motor 76, advance rubber rod 58 and its coating 66, providing the drive means for the entire system. Coated rubber rod 58 is advanced into fly knife type cutter 78, which is driven by cutter motor 80 to cut coated rod 58 up into a continuous stream of injection site members 24, each comprising a rubber disc 26 having peripheral thermoplastic coating 28, for example.

Discs 24 may be collected in a conventional shaker basket, and from there presented to automated machinery for installing injection site members 24 into the bore of a tube as in FIGS. 2, 3, or 6, or for application to an appropriate surface as in FIG. 5, with an automated heat sealing process of bonding for substantially complete automation of the injection site manufacturing process.

Alternatively, rubber rod 58 may be a thermoplastic rubber formulation, for example a block copolymer of a rubbery polyolefin and polystyrene such as KRATON or KRATON G sold by the Shell Chemical Company. Such a rubber rod may be extrusion coated with a coating 66 of polyethylene, which then may be heat-sealed to a compatible polyolefin sleeve or other surface, typically also made of polyethylene.

Accordingly, a sturdy, inexpensive injection site is provided, the manufacture of which may be automated for substantial product improvement at low cost.

The above has been offered for illustrative purposes only and is not to be considered as limiting the scope of the invention of this application, which is as defined in the claim below.

That which is claimed is:

1. The method of manufacturing an injection site, which comprises the steps of:
    coating a rod of puncture-resealable rubber with a plastic coating material;
    transversely slicing said coated rod into at least one disc having a coated peripheral surface and uncoated, spaced apart, end surfaces; and
    bonding by heat sealing the plastic coating material of said disc to a surface made of material which is sealingly compatible with the plastic coating material to affix said disc into a predetermined position relative to said surface.

2. The method of manufacturing an injection site, which comprises the steps of:
    coating a rod of puncture-resealable rubber with a plastic coating material;
    transversely slicing said coated rod into at least one disc having a coated peripheral surface and uncoated, spaced apart, end surfaces; and
    bonding by solvent sealing the plastic coating material of said disc to a surface made of material which is sealingly compatible with the plastic coating material to affix said disc into a predetermined position relative to said surface.

3. The method of claim 1 or 2 in which said bonding step comprises bonding said disc within the bore of a tube made of the compatible material.

4. The method of claim 1 or 2 in which said bonding step comprises bonding said disc to a flat surface made of the compatible material to form an annular bond between the flat surface and the plastic coating material of the disc.

5. The method of claim 4 in which said flat surfaces are plastic containers.

6. The method of claim 1 or 2 in which said disc is made of polyisoprene rubber.

7. The method of claim 1 or 2 in which said plastic coating material is selected from the group consisting of thermoplastic polyvinyl chloride and polyolefins.

8. The method of manufacturing an injection site, which comprises the steps of:
    chlorinating the surface of a rod of punctureresealable hydrocarbon rubber;
    coating said rod with a plastic coating material;
    transversely slicing said coated rod into at least one disc having a coated peripheral surface and uncoated, spaced apart, end surfaces; and
    bonding by heat sealing the plastic coating material of said disc to a surface made of a material which is sealingly compatible with the plastic coating material to affix said disc into a predetermined position relative to said surface.

9. The method of manufacturing an injection site, which comprises the steps of:
    chlorinating the surface of a rod of punctureresealable hydrocarbon rubber;
    coating said rod with a plastic coating material;
    transversely slicing said coated rod into at least one disc having a coated peripheral surface and uncoated, spaced apart, end surfaces; and bonding by solvent sealing the plastic coating material of said disc to a surface made of a material which is sealingly compatible with the plastic coating material to affix said disc into a predetermined position relative to said surface.

10. The method of claim 8 or 9 in which said plastic coating material of the disc is a thermoplastic material.

11. The method of claim 10 in which said thermoplastic material is selected from the group consisting of polyvinyl chloride and polyolefins.

12. The method of claim 11 in which said puncture-resealable rubber is made of polyisoprene.

13. A method of forming a discshaped rubber article and affixing the article to a surface comprising the steps of:
forming a rod from a rubber material;
coating the rod with a plastic coating material;
transversely slicing the rod into at least one disc-shaped rubber article having opposed major faces and a periphery therebetween with only the periphery carrying the plastic coating material and the major faces being essentially free of the plastic coating material; and
bonding by heat sealing the plastic coating material at the periphery of the disc-shaped rubber article to a surface made of a material which is sealingly compatible with the plastic coating material to affix the disc-shaped rubber article in a predetermined position relative to the surface.

14. A method of forming a disc-shaped rubber article and affixing the article to a surface comprising the steps of:
forming a rod from a rubber material;
coating the rod with a plastic coating material;
transversely slicing the rod into at least one disc-shaped rubber article having opposed major faces and a periphery therebetween with only the periphery carrying the plastic coating material and the major faces being essentially free of the plastic coating material; and
bonding by solvent sealing the plastic coating material at the periphery of the disc-shaped rubber article to a surface made of a material which is sealingly compatible with the plastic coating material to affix the disc-shaped rubber article in a predetermined position relative to the surface.

15. A method according to claim 13 or 14 wherein said rod forming step comprises forming the rod from a puncture-resealable rubber material.

16. A method according to claim 15 wherein said bonding step comprises bonding the disc-shaped article made from the puncture-resealable rubber material within the bore of a tube made of the compatible material to form an injection site within the tube.

17. A method according to claim 15 wherein said bonding step comprises bonding the disc-shaped article made from the puncture-resealable rubber material to flat surface made of the compatible material to form an annular bond between the flat surface and the plastic coating material carried at the periphery of the disc-shaped article, thereby forming an injection site on the flat surface.

18. A method according to claim 13 or 14 wherein said rod coating step comprises coating the rod with a thermoplastic material.

19. A method according to claim 18 wherein the thermoplastic material is polyvinyl chloride.

20. A method according to claim 13 or 14 wherein said rod coating step comprises coating the rod with a polyolefin material.

* * * * *